(12) United States Patent
Minovic et al.

(10) Patent No.: US 11,245,532 B2
(45) Date of Patent: Feb. 8, 2022

(54) AUTHENTICATION METHOD FOR A CLIENT OVER A NETWORK

(71) Applicant: Blink.ing doo, Belgrade (RS)

(72) Inventors: Miroslav Minovic, Belgrade (RS);
Milos Milovanovic, Belgrade (RS);
Migitko Aleksei, Belgrade (RS)

(73) Assignee: BLINK.ING DOO, Belgrade (RS)

( * ) Notice: Subject to any disclaimer, the term of this patent is extended or adjusted under 35 U.S.C. 154(b) by 347 days.

(21) Appl. No.: 16/458,934

(22) Filed: Jul. 1, 2019

(65) Prior Publication Data
US 2020/0036531 A1 Jan. 30, 2020

(30) Foreign Application Priority Data
Jul. 30, 2018 (EP) ...................... 8186310

(51) Int. Cl.
*H04L 29/06* (2006.01)
*H04L 9/32* (2006.01)
(Continued)

(52) U.S. Cl.
CPC .......... *H04L 9/3236* (2013.01); *H04L 9/0637* (2013.01); *H04L 9/0643* (2013.01); *H04L 9/3213* (2013.01); *H04L 9/3271* (2013.01); *H04L 67/104* (2013.01); *H04L 9/3231* (2013.01); *H04L 2209/38* (2013.01)

(58) Field of Classification Search
CPC ... H04L 9/3236; H04L 9/0637; H04L 9/0643; H04L 9/3213; H04L 9/3271; H04L 67/104; H04L 9/3231; H04L 2209/38
See application file for complete search history.

(56) References Cited

U.S. PATENT DOCUMENTS 10,135,835 B1 * 11/2018 Kandel ................... H04L 63/08
2013/0219472 A1 8/2013 Hsu
(Continued)

FOREIGN PATENT DOCUMENTS

CN 104092702 A 10/2014
KR 20170107409 A 9/2017

*Primary Examiner* — Malcolm Cribbs
(74) *Attorney, Agent, or Firm* — The Watson IP Group, PLC; Jovan N. Jovanovic

(57) ABSTRACT

An authentication method for authenticating a client with a service over a network of peers, comprises: storing encrypted enrolled authentication data for the client in a storage that is accessible by means of an access privilege; storing a decryption clue for the encrypted enrolled authentication data in a client data block chain; receiving, by the network, authentication information from the client; generating, by a server connected to the client, a decryption key according to a contract involving the decryption clue stored in the client data block chain; receiving, by the network, the encrypted enrolled authentication data from the storage; decrypting, by the network, the encrypted enrolled authentication data using the decryption key to obtain decrypted enrolled authentication data; comparing, by the network, the decrypted enrolled authentication data with the authentication information received from the client for obtaining a match score based on a consensus of the peers of the network; and storing the match score and a hash of a client identifier in a service data block chain.

14 Claims, 9 Drawing Sheets

(51) Int. Cl.
    *H04L 9/06*         (2006.01)
    *H04L 29/08*      (2006.01)

(56) References Cited

U.S. PATENT DOCUMENTS

| | | | |
|---|---|---|---|
| 2015/0288694 A1* | 10/2015 | Liebl, III | H04L 63/0884 |
| | | | 713/182 |
| 2017/0094509 A1* | 3/2017 | Mistry | H04L 63/0823 |
| 2017/0236123 A1* | 8/2017 | Ali | G06Q 20/3825 |
| | | | 705/75 |
| 2017/0264429 A1 | 9/2017 | Ahn et al. | |
| 2019/0165949 A1* | 5/2019 | Ramos | H04L 9/3247 |
| 2019/0319794 A1* | 10/2019 | Haldar | H04L 63/10 |

\* cited by examiner

AUTHENTICATION METHOD FOR A CLIENT OVER A NETWORK

FIELD OF THE INVENTION

The present invention is in the field of authentication procedures. More specifically, the present invention relates to the use of distributed ledgers for employing biometrics in authentication procedures over distributed networks.

BACKGROUND

The growing prevalence of digital services accessible over communication networks has increased the significance of handling the digital identity of users while at the same time guarding the confidentiality of user information and the security of access rights.

A commonly used digital identity is implemented by a username-password combination, wherein the password authenticates the user associated with the username with a characteristic sequence of characters known only to the user. However, usernames as well as passwords can easily be forgotten, such that the security associated with the digital identity is often reduced by the necessity to introduce password retrieval operations, which can introduce security vulnerabilities.

An elegant solution to this problem could be the authentication based on information which is characteristic to the user, such as biometric characteristics of the face, fingerprints, iris, or the like.

However, the use of biometrics introduces two intrinsic problems. First, characteristic information of the body of the user is considered to be personal information and users are therefore reluctant to provide the information to non-trusted services. Second, biometric information intrinsically varies depending on the capture, such that obfuscated biometric information, which is obfuscated such as to prohibit retrieving the initially captured biometric information, is highly difficult to compare or introduces security leaks.

Biometric information in user authentication has therefore been mostly confined to procedures involving local capture and comparison on a local terminal of the user, or in authentication towards trusted organizations, which a user might be willing to provide biometric information to or with whom the user has already shared biometric information, such as government organizations or trusted bank institutes.

The known authentication procedures therefore have intrinsically limited application towards non-trusted organizations or provide security loopholes on the local terminal of the user.

SUMMARY OF THE INVENTION

The object of the invention is therefore to provide an efficient authentication procedure compatible with biometric data, which addresses these problems with a secure authentication method and intrinsically limits access to user information of a potentially non-trusted service that requires authentication by a user.

This object is solved by a set of methods and communication network entities according to the independent claims. The dependent claims relate to preferred embodiments.

According to a first aspect, the invention relates to an authentication method for authenticating a client with a service over a network of peers. The method comprises storing encrypted enrolled authentication data for the client in a storage that is accessible by means of an access privilege; and storing a decryption clue for the encrypted enrolled authentication data in a client data block chain. The method further comprises receiving, by the network, authentication information from the client. Further, the method comprises generating, by a server connected to the client, a decryption key according to a contract involving the decryption clue stored in the client data block chain. The method further comprises receiving, by the network, the encrypted enrolled authentication data from the storage; decrypting, by the network, the encrypted enrolled authentication data using the decryption key to obtain decrypted enrolled authentication data; and comparing, by the network, the decrypted enrolled authentication data with the authentication information received from the client for obtaining a match score based on a consensus of the peers of the network. Furthermore, the method comprises storing the match score and a hash of a client identifier in a service data block chain.

The network of peers can relate to connected peers, which may be entrusted by the user with the processing of anonymized authentication information and may be entrusted by the service to provide reliable authenticity review. For example, the peers may be organizations selected by the user of the client for authenticating his authentication information, such as government entities, nonprofit organizations, or other organizations which require similar authentication information as part of providing the service, such as bank institutions or insurance companies.

In some examples, the peers are endorsing peers of a permissioned block chain network, wherein a consensus of the peers may affect the state of a shared ledger, such as the client data block chain or the service data block chain. As part of the consensus, the peers may authenticate and/or endorse and/or execute smart contracts, such as chain code, wherein authentication, verification, access rights and/or privileges may be validated based on the consensus, and the consensus may be recorded in the ledger. Information stored in the shared ledger associated with the network may provide a transparent history of past access or authentication events.

The shared ledger may record any challenge request for the client received from a service and any performed authentication method for the enrolled authentication data of the client, such as to provide a history of access requests for the enrolled authentication data. In particular, the client data block chain may record any performed comparison between the enrolled authentication data and authentication information provided to the network.

For any performed comparison which is recorded, a shared ledger, such as the service data block chain, may record information regarding the authentication modality used and/or any steps involved in the authentication modality and/or information pertaining to a relation between the client and the service.

In some examples, the client identifier is not recorded on a shared ledger, such as the client data block chain or the service data block chain, and the client is rather represented with the hash of the client identifier, and in particular a specific hash of the client identifier being specific for the service.

In some examples, a hash of the authentication information provided to the network is stored in the client data block chain, such as to allow the client to verify whether compared authentication information corresponds to authentication information submitted by the client.

In some examples, the client may request portions of or access the information stored in the client data block chain.

Access to the client data block chain for the client may be granted based on a consensus of the network, such as a consensus on a signature of the client.

In preferred embodiments, the client approves execution of the authentication method by providing a signature of the client, such as to authorize the network to compare the enrolled authentication data with the authentication information.

The network of peers can provide a trusted intermediary tasked with the comparison of enrolled authentication data, which has been enrolled previously as part of the registration of the client, with authentication information provided by the client to verify the authenticity of the client. Preferably, the network of peers comprises at least two peers.

The enrolled authentication data and the authentication information may comprise information pertaining to the knowledge of the user, such as a password, a pin, or a hash thereof. However, the enrolled authentication data and the authentication information are preferably combined with or comprise information characterizing the user and/or an item in the possession of the user, or a combination thereof.

In preferred embodiments, the enrolled authentication data and the authentication information comprise characteristic information of the user authenticating as the client, such as biometric information relating to the body of the user, for example fingerprint information, iris scans, facial characteristics, or the like; or information relating to behavioral characteristics specific to the user, such as voice characteristics, body posture or body movement, or user response to a stimulus, such as a request or displayed information, any combination thereof, or the like. The biometric information may be obfuscated by the client or the server, such as by extracting feature vectors from image data relating to the biometric information.

In some embodiments, the enrolled authentication data and the authentication information comprise information pertaining to an item associated with or in the possession of the user, such as an (machine) ID of a device, private keys/digital signature stored in a device of the user, SMS/Email tokens associated with an email address or phone number of the user, USB tokens associated with a USB device provided by the user, any hash or combination thereof, or the like.

In some embodiments, the network comprises at least two peers, and different peers of the network provide respective matching algorithms for different elements of the enrolled authentication data and the authentication information.

In preferred examples, modifying the content of the enrolled authentication data registered to an authentication modality with the service requires an authorization by the service, such as by limiting modification of the enrolled authentication data used in an authentication method between the client and the service to a request for re-registration of the enrolled authentication data of the client with the service. Hence, the enrolled authentication data registered with the service may not be compromised by gaining access to the client.

In preferred examples, the storage is configured to delete the enrolled authentication data in response to a request for deletion of the enrolled authentication data authorized by the client. The request for deletion of the enrolled authentication data may be recorded in the client data block chain and may be authorized based on a consensus of the network.

To support anonymity of the user and protect the content of enrolled authentication data, the enrolled authentication data is stored in the storage in encrypted form and may be stored with an identifier of the client or a derivative of the identifier of the client, such as a hash of the identifier of the client, a public key corresponding to a private key of the client, or a hash of the public key of the client.

The enrolled authentication data may be encrypted using an encryption key derived from the decryption clue. The decryption clue may be an initial value for deriving the encryption/decryption key, such as a seed value, which when used in a deterministic key generation function results in the encryption/decryption key.

To obtain the encryption/decryption key from the decryption clue, the contract can be executed by the server and/or at least one peer of the network Preferably, to derive the encryption/decryption key from the decryption clue, at least one additional seed input may be required, such that reading the description clue in the client data block chain may not allow decrypting the encrypted enrollment authentication data by any party gaining access to the client data block chain. The additional seed input may be an input provided by the client, the network, or the server.

In preferred embodiments, the contract is a machine dependent decryption key generation method generating the decryption key from the decryption clue depending on a hardware configuration of the server.

In other words, the additional seed input to the contract may be derived from internal machine information of the server and hence, the decryption key for the encrypted enrolled authentication data may only be generated by the server.

In preferred embodiments, the method comprises an enrollment method which can comprise receiving, from the client, authentication data collected by the client to be used as the enrolled authentication data; generating the decryption clue for the enrolled authentication data; generating, by the server, an encryption key involving the decryption clue in a machine dependent encryption key generation method; and encrypting, using the encryption key, the enrolled authentication data for obtaining the encrypted enrolled authentication data.

The enrolled authentication data may be encrypted using a symmetric encryption protocol, such that the encryption key can also be the decryption key, or an asymmetric encryption protocol, such that the decryption key can be different from the encryption key but also derivable from the decryption clue. The decryption clue can be stored in the client data block chain after the enrolled authentication data has been encrypted, and the encryption/decryption key may be discarded. The enrolled authentication data may be encrypted by the client, the server, a peer of the network, or an intermediary encryption/decryption entity.

Following an authentication request for the client, the network of peers can receive authentication information from the client to be compared to the enrolled authentication data stored in the storage. The storage can be accessible by the network using an access privilege, wherein the access privilege for accessing the enrolled authentication data of the client may be derived from a consensus of the network of peers and/or a signature of the client, such that the enrolled authentication data of the client can be made accessible in response to an authentication request for the client and access can be restricted if no or no recent authentication request is available for the client, such as no recent authentication request within the last day, last hour, last quarter of an hour, any validity period specified by the service and/or the client, or the like.

In some examples, the storage is configured to provide the encrypted enrolled authentication data to peers of the network based on evidence of a consensus of the network, such as a consensus on the access privilege recorded in the client data block chain.

The storage can be at least one physical data store which may be associated with a peer of the network of peers, may be a distributed storage distributed among the peers of the network of peers, or may be associated with a third party tasked with handling the encrypted information, such that the storage may not be physically associated with each peer of the network of peers or may not be physically associated with the server.

The encrypted enrollment authentication data is decrypted by the network using the decryption key generated by the server with the decryption clue, and is compared with the authentication information received from the client according to a modality. Said modality may be specified by the service and may be recorded in the service data block chain.

The modality used for the comparison of the enrolled authentication data with the authentication information may depend on the type of the authentication information, and corresponding modalities, such as finger print or facial characteristic comparison modalities, which can be executed by peers of the network, are known in the art and will not be described herein.

As a result of comparing the encrypted enrolled authentication data with the authentication information (in the following also referred to as "matching"), the peers can provide a match score characterizing the degree of similarity between the decrypted enrolled authentication data and the authentication information.

The match score and a hash of an identifier of the client are stored in the service data block chain. The result of the comparison between the hash of the enrolled authentication data with the hash value of the decrypted enrolled authentication data may be stored with the match score. The storing of the match score with the hash of the client identifier in the service data block chain may comprise a consensus of the peers of the network on the match score, such as a consensus on obtaining a similar, or a minimum value of the match score and preferably the same match score.

Hence, the match score stored in the service data block chain indicates a consensus of the network of peers on the authenticity of the authentication information provided in response to an authentication request. The service may access the service data block chain and retrieve the match score and the hash of the client identifier.

In some embodiments, the method further comprises storing a hash of the enrolled authentication data with the decryption clue in the client data block chain.

By storing a hash of the enrolled authentication data with the decryption clue in the client data block chain, the authenticity of the encrypted enrolled authentication data may be validated by the network at the time of the authentication by comparing the hash of the enrolled application data, which is stored in the client data block chain, with a hash of the decrypted enrolled authentication data.

Hence, the method may comprise comparing, by the network, the hash of the enrolled authentication data stored in the client data block chain with a hash value of the decrypted enrolled authentication data for validating the authenticity of the enrolled authentication data.

As a result, the client may be authenticated with the service, wherein the service can recognize a successful authentication based on the hash of the client identifier stored with the match score.

The authenticity of the user/client and/or the enrolled authentication data can be validated by the network of peers which can be independent from the service. Thus, the service may not obtain access to the authentication data, the authentication information, and/or the client identifier as part of the authentication method.

A high degree of transparency can nonetheless be provided for the client and/or the service by providing access to the information stored in the client data block chain and/or service data block chain. In particular, access to information stored the client data block chain for the client may be granted to the client, and access to the information stored in the service data block chain for the client and/or the service can be granted to the client and the server.

Since the enrolled authentication data is not stored in a shared ledger, such as the client data block chain, but is stored in an encrypted form in the storage, the submitted authentication data can be revoked by the client. Additionally, the access to the storage may be restricted to events of a trust based decision between peers of the network and/or may be limited to events authenticated by the client/user, increasing the confidentiality of the enrolled authentication data.

To further limit access to the enrolled authentication data, the enrolled authentication data may be re-encrypted following the generation of the decryption key by the server.

In preferred embodiments, the method therefore comprises generating, by the server, a re-encryption key involving the decryption key as a new decryption clue in a contract for generating an encryption key; re-encrypting the decrypted enrolled authentication data using the re-encryption key for obtaining re-encrypted enrolled authentication data; storing the re-encrypted enrolled authentication data in the storage. The method may further comprise removing the encrypted enrolled authentication data from the storage.

In some examples, the decrypted enrolled authentication data is re-encrypted by the server. The server may access the storage using an access privilege, wherein the access privilege may be provided by a signature of the server, the client and/or the network, and/or a consensus on the re-encryption by the network.

In preferred embodiments, the decrypted enrolled authentication data is re-encrypted by at least one selected peer of the network using a re-encryption key provided by the server. The network and/or the at least one selected peer of the network may access the storage using an access privilege, wherein the access privilege may be provided by a signature of the server, the client and/or the network, and/or a consensus on the re-encryption by the network.

In some examples, the method comprises storing the decryption key as the new decryption clue in the client data block chain.

The re-encryption may further allow changing the encryption modality. In some examples, the method may hence comprise re-encrypting the encrypted enrolled authentication data in response to a change of the encryption modality used in the authentication method.

In some examples, the authentication method is initiated by a request of the service.

In preferred embodiments, the method comprises receiving, from the service, a challenge request for the client, wherein the challenge request is associated with the hash of the client identifier, and storing the challenge request in the service data block chain. Further, the method comprises providing, to the client, the challenge request; and updating the challenge request with the match score in the service data block chain. Additionally, receiving the authentication information by the network can comprise receiving an identifier of the challenge request, such as to indicate the authentication modality for the matching.

The challenge request may hence specify the modalities of the challenge, such as the type of authentication information to be compared. For example, the challenge request may comprise a request for a certain type of biometric information of the user associated with the hash of the client identifier.

In some examples, the service may initiate the registration of the client with the service by ordering a registration token to be used by the client in a registration process, such as to establish a relationship between the client and the service recognized by the network.

In preferred embodiments, the method comprises receiving, from the service, an order for a registration token for a client registration; generating, by the network, the registration token and storing the registration token in the storage or the service data block chain; and providing, to the service, the registration token. The method further comprises receiving a signed registration token signed by the client. Further, the method comprises updating the registration token in the storage or the service data block chain with a hash of the client identifier; and providing, to the service, the hash of the client identifier.

The method may further comprise providing, from the service to the client, the registration token; and signing, by the client, the registration token.

By signing the registration token, the registration of the client with the service may be controlled by the client and may be verified by the server and/or the network.

In some examples, a different hash of the client identifier is created for each registration token signed by the client. For example the client may be hashed a number of times for obtaining the hash of the client identifier, wherein the number of times may correspond to the number of registration tokens signed by the client. Hence, a different hash of the client identifier may be provided to each service a client registers to.

In a second aspect, the invention relates to an authentication method for authenticating a client with a service over a network of peers. The method according to the second aspect may be performed by the server and comprises processing an enrollment request of the client for storing encrypted enrolled authentication data in a storage that is accessible by means of an access privilege; ordering a storing of a decryption clue for the encrypted enrolled authentication data in a client data block chain; and processing a verification request of the client for authenticating authentication information to be authenticated by the network. The method further comprises generating a decryption key according to a contract corresponding to the verification request, the contract involving the decryption clue stored in the client data block chain; and sending the decryption key for decrypting the encrypted enrolled authentication data to the network. Further, the method comprises ordering the addition of a match score of a comparison of the authentication information with the encrypted enrolled authentication data with a hash of a client identifier to a service data block chain based on a consensus of the peers of the network.

In some examples, some or all of the steps of the method of the second aspect are performed by the server.

In the third aspect, the invention relates to an authentication method for authenticating a client with a service over a network of peers, the method comprising: receiving authentication information of the client; receiving encrypted enrolled authentication data from a storage that is accessible by means of an access privilege; and receiving a decryption key generated according to a contract involving a decryption clue stored in a client data block chain. The method further comprises decrypting the encrypted enrolled authentication data using the decryption key to obtain decrypted enrolled authentication data; comparing the decrypted enrolled authentication data with the authentication information for obtaining a match score based on a consensus of the peers of the network; and processing the match score for storing the match score and a hash of a client identifier in a service data block chain.

In some examples, some or all of the steps of the method according to the third aspect are performed by the network.

The method according to the second and/or third aspect may be combined with the first aspect or may further implement embodiments of the first aspect to provide an authentication method.

For example, in a method according to the second and/or third aspect, the contract may be a machine dependent decryption key generation method generating the decryption key from the decryption clue depending on a hardware configuration of the server.

In a fourth aspect, the invention relates to a system for authenticating a client with a service over a network of peers. The system comprises a server and a storage that is accessible by means of an access privilege. The storage stores encrypted enrolled authentication data for the client. The server orders the addition of a decryption clue to a client data block chain; and generates a decryption key according to a contract involving the decryption clue stored in the client data block chain. The network receives the encrypted enrolled authentication data from the storage; decrypts the encrypted enrolled authentication data using the decryption key to obtain decrypted enrolled authentication data; and compares the decrypted enrolled authentication data with authentication information received from the client for obtaining a match score based on a consensus of the peers of the network to be stored with a hash of a client identifier in a service data block chain.

The system according to the fourth aspect may further implement any one of the embodiments of the first, second and/or third aspect or may comprise means for implementing steps of the first, second and/or third aspect or their embodiments.

In preferred embodiments, the contract is a machine dependent decryption key generation method generating the decryption key from the decryption clue depending on a hardware configuration of the server.

In preferred embodiments, the system stores a hash of the enrolled authentication data with the decryption clue in the client data block chain.

In preferred embodiments, the server is further adapted to: generate a re-encryption key involving the decryption key as an encryption clue involved in a contract for generating an encryption key. The system is further adapted to: re-encrypt the decrypted enrolled authentication data using the re-encryption key for obtaining re-encrypted enrolled authentication data; store the decryption key as the new decryption clue in the client data block chain; store the re-encrypted enrolled authentication data in the storage; and remove the encrypted enrolled authentication data from the storage.

In a fifth aspect, the invention relates to a distributed network of peers for authenticating a client with a service. The network is adapted for communicating with a server and is further adapted to receive authentication information of the client; receive encrypted enrolled authentication data from a storage that is accessible by means of an access privilege; and receive a decryption key for the encrypted enrolled authentication data generated by the server according to a contract involving a decryption clue stored in a client data block chain. The network is further adapted to decrypt the encrypted enrolled authentication data using the decryption key to obtain decrypted enrolled authentication data; compare the decrypted enrolled authentication data with authentication information received from the client for obtaining a match score based on a consensus of the peers of the network; and transmit the match store for storing the match score with a hash of a client identifier in a service data block chain.

In a sixth aspect, the invention relates to a server for authenticating a client with a service over a network of peers. The server is adapted to process an enrollment request of the client for storing encrypted enrolled authentication data in a storage that is accessible by means of an access privilege; and generate a decryption key according to a contract involving a decryption clue for the encrypted enrolled authentication data. The server is further adapted to order the addition of the decryption clue to a client data block chain; process a verification request of the client for authenticating authentication information to be authenticated by the network; and order the addition of a match score of a comparison of the authentication information with the encrypted enrolled authentication data with a hash of a client identifier to a service data block chain based on a consensus of the peers of the network.

In preferred embodiments, the contract is a machine dependent decryption key generation method generating the decryption key from the decryption clue depending on a hardware configuration of the server.

The server according to the fifth aspect and the network according to the sixth aspect may implement the method according to the third and second aspect, respectively, or may implement method steps of the first aspect.

In a seventh aspect, the invention relates to a computer program comprising computer readable instructions for implementing a method according to any one of the first, second, or third aspects or any one of their embodiments, or for implementing the system, network, or server of the fourth, fifth, or sixth aspects, or any one of their embodiments.

DETAILED DESCRIPTION OF EMBODIMENTS

The features and numerous advantages of the authentication method according to the present invention will best be understood from a detailed description of preferred embodiments with reference to the accompanying drawings, in which.

Figure 1:
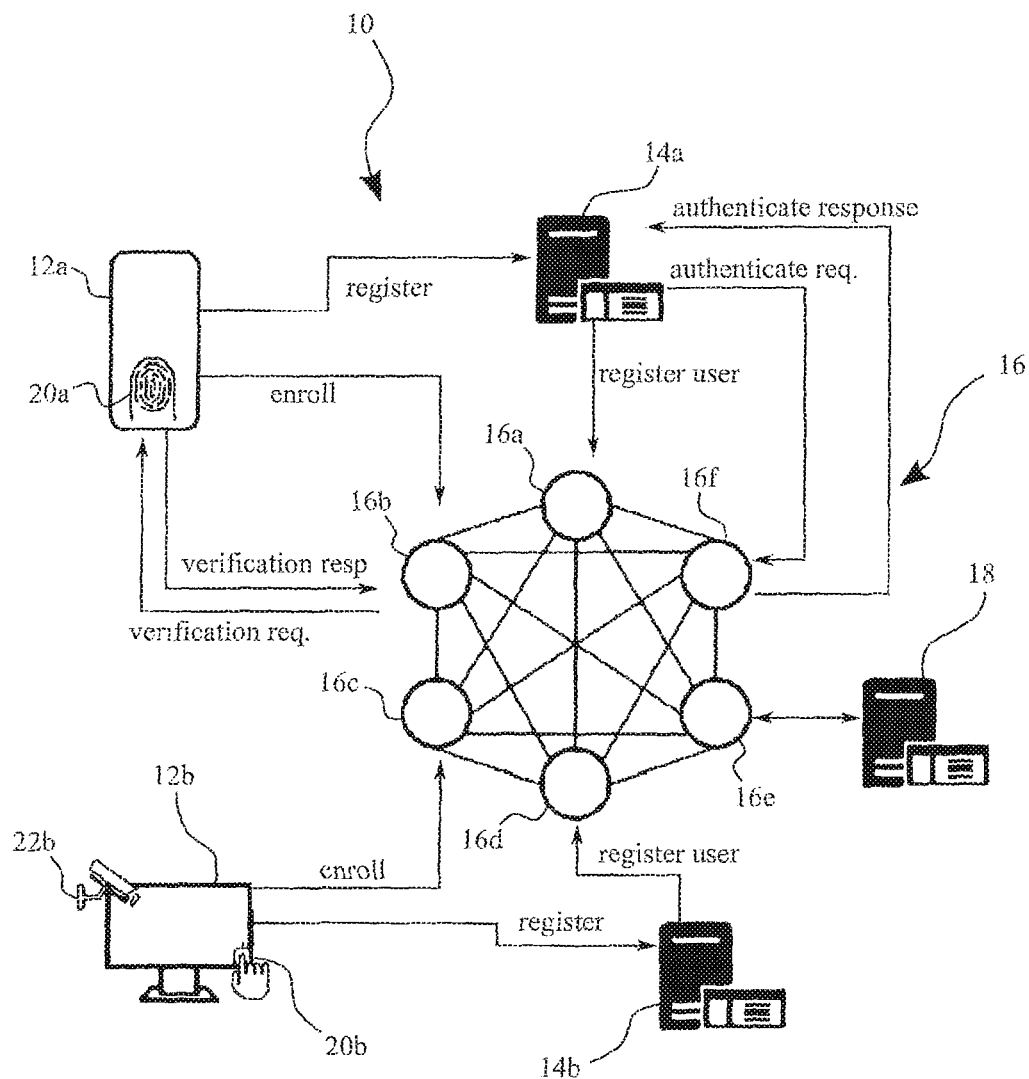
FIG. 1 is a schematic diagram of a system to authenticate clients with services according to an example.

FIG. 1 illustrates a schematic diagram of a system 10 to authenticate clients 12a, 12b with services 14a, 14b over a network 16 according to an example. The network comprises peers 16a-16e, which may be implemented by trusted-organization devices 18. The client 12a is illustrated as a mobile terminal 12a comprising a fingerprint sensor 20a. The client 12b is illustrated as a fixed terminal 12b comprising a fingerprint sensor 20b and a camera 22b. The straight black arrows illustrate messaging paths between the respective clients 12a, 12b, services 14a, 14b and the network 16.

The network 16 is part of the system 10 and may act as a trusted intermediary between the client 12a, 12b and the service 14a, 14b and may authenticate biometric information captured by sensors 20a, 20b, or 22b of the client 12a, 12b.

Figure 2:
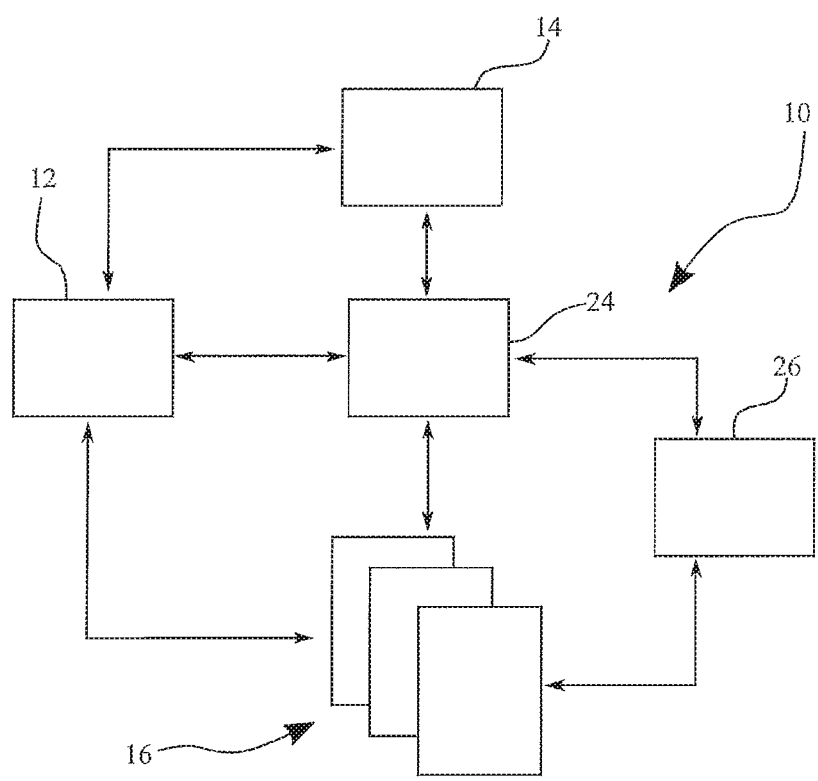
FIG. 2 is a schematic diagram of a system to authenticate a client with a service according to an example.

FIG. 2 shows a schematic view of some of the components of the system 10 according to an example. The system 10 comprises a server 24, the network 16, and a storage 26 accessible by the server 24 and/or the network 16 using an access privilege. A client 12, such as the clients 12a, 12b can interact with a service 14, such as the services 14a, 14b. When the authentication of the user of the client 12 is required, the service 14 may request authentication of the client 12 using the system 10. An authentication challenge raised by the service 14 may be received by the server 24 and may be answered by the client 12 during an authentication.

Initially, the service 14, 14a, 14b may have no identifier of the client 12, 12 a, 12b in relation to the system 10, and an initial registration step may be performed to provide a hash of a client identifier of the client 12, 12 a, 12b to the service 14, 14a, 14b.

Referring back to FIG. 1, a client 12, 12, 12a, 12b wishing to authenticate with the service 14, 14a, 14b, which may be a non-trusted organization for the client 12, 12a, 12b, can initiate registration with the service 14, 14a, 14b ("register"). The service 14, 14a, 14b can provide an identifier of the service 14, 14a, 14b to the system 10 with a registration request ("register user"). In some examples, the registration request does not contain information pertaining to the user and/or the client 12a, 12b.

The network 16 can create a registration token for the registration request to be sent to the client 12, 12a, 12b, which is returned to the service 14, 14a, 14b. The service 14, 14a, 14b may forward the registration token to the client 12, 12a, 12b, which may sign the registration token with a signature derived from an identifier of the client 12a, 12b and may send the signed registration token to the system 10. The network 16 may review the signature of the signed registration token, and, if the review is positive, may record the successful registration of the client 12, 12a, 12b in a service data block chain (not shown) by recording an identifier of the service 14, 14a, 14b with a hash of a client identifier of the client 12, 12a, 12b. The service 14, 14a, 14b may consult the service data block chain to obtain the hash of the client identifier and/or verify whether the registration was successful.

Figure 3:
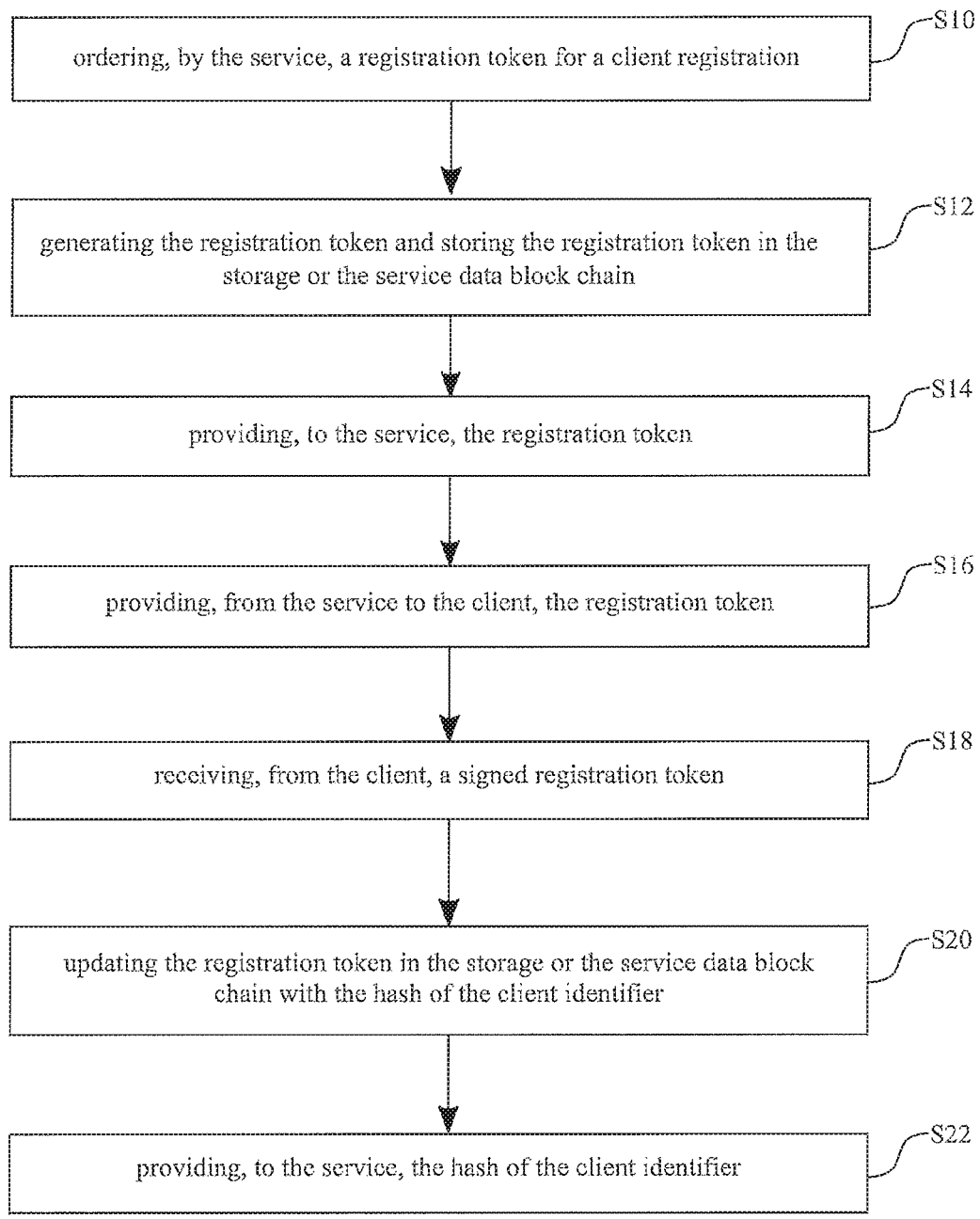
FIG. 3 is a flow diagram of a client registration according to an example.

A flow diagram of a registration process according to an example is illustrated in FIG. 3. The illustrated method comprises ordering, by the service 14, 14a, 14b, a registration token for a client registration (step S10); generating, by the network 16, the registration token and storing the registration token in the storage or the service data block chain (step S12); providing, to the service 14, 14a, 14b, the registration token (step S14); providing, from the service 14, 14a, 14b to the client 12, 12a, 12b, the registration token (step S16). The method further comprises receiving, from the client 12, 12a, 12b, a signed registration token (step S18); updating the registration token in the storage or the service data block chain with the hash of the client identifier (step S20); and providing, to the service 14, 14a, 14b, the hash of the client identifier (step S22).

The service 14, 14a, 14b may be provided with the hash of the client identifier by providing access to the service data block chain to the service 14, 14a, 14b.

Thus, the service 14, 14a, 14b may initiate the creation of a registration token for registration of the client 12, 12a, 12b. The client 12, 12a, 12b can then decide whether to sign the registration token, such as by a signature involving an asymmetric cryptography function, for example by public key cryptography. The service 14, 14a, 14b can receive a hashed client identifier from the service data block chain, which may be a unique hash of the client identifier for said service 14, 14a, 14b.

The client 12, 12a, 12b may enroll authentication data with the system 10 according to an authentication modality specified by the service 14, such as fingerprint scan, facial scan, iris scan, an extracted feature vector of a biometric scan, any combination thereof, or the like to be used in an authentication of the client 12, 12a, 12b.

The authentication modality may be stored in the service data block chain. The client 12, 12a, 12b and/or the network 16 may receive the authentication modality by accessing the service data block chain and reading an entry associated with an identifier of the service 14, 14a, 14b, wherein said identifier of the service 14, 14a, 14b may be stored in the service data block chain with the registration token signed by the client 12, 12a, 12b.

Figure 4:
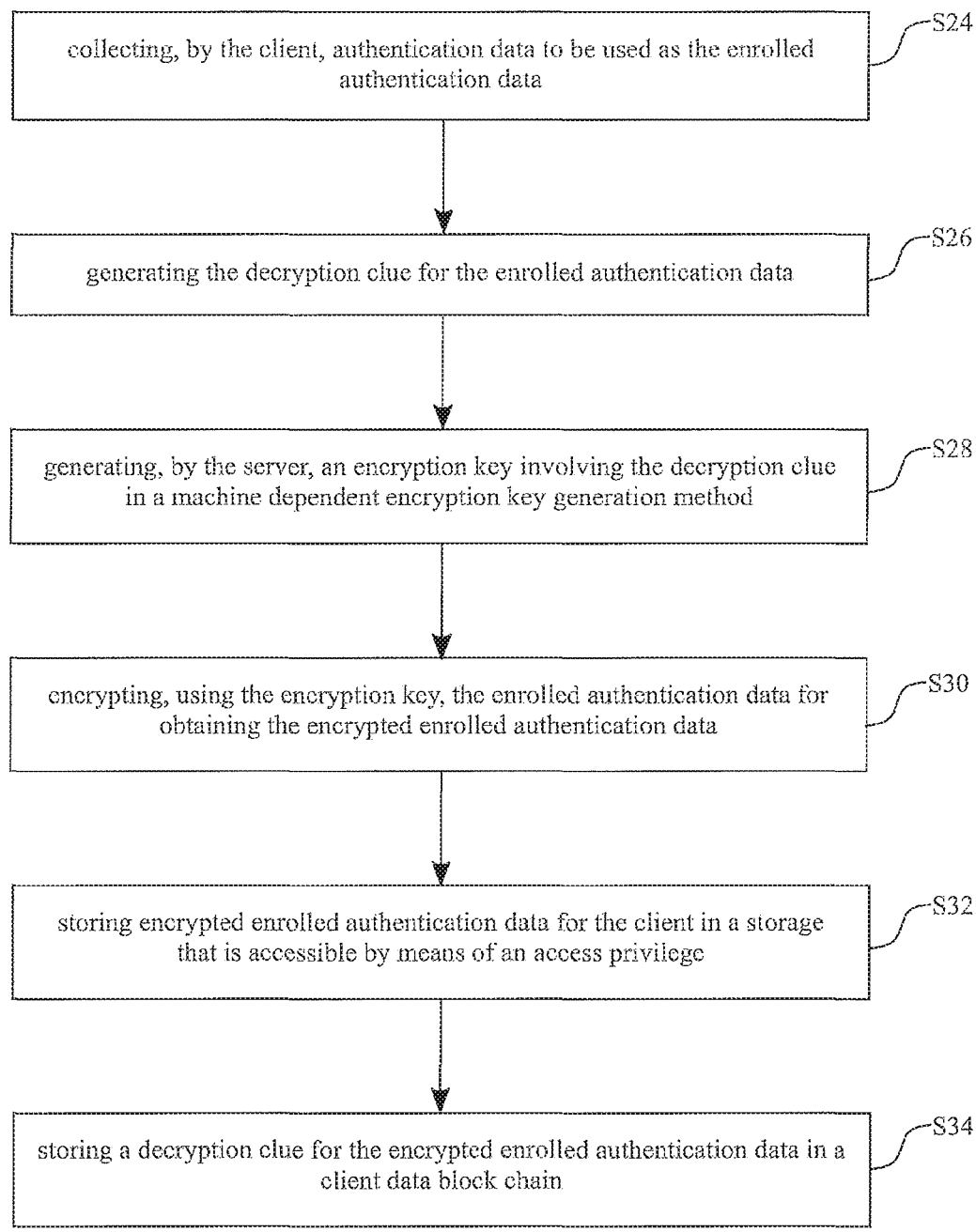
FIG. 4 is a flow diagram of an enrollment process of a client according to an example.

A flow diagram of an exemplary enrollment process is illustrated in FIG. 4. The illustrated method comprises collecting, by the client 12, 12a, 12b, authentication data to be used as the enrolled authentication data (step S24); generating the decryption clue for the enrolled authentication data (step S26); generating, by the server 24, an encryption key involving the decryption clue in a machine dependent encryption key generation method (step S28); encrypting, using the encryption key, the enrolled authentication data for obtaining the encrypted enrolled authentication data (step S30). The method further comprises storing encrypted enrolled authentication data for the client 12, 12a, 12b in a storage 26 that is accessible by means of an access privilege (step S32); and storing a decryption clue for the encrypted enrolled authentication data in a client data block chain (step S34).

The encrypted enrolled authentication data can be used as a reference sample in an authentication for the user of the client 12, 12a, 12b with the service 14, 14a, 14b. Preferably, a cooperation of the network 16 and the server 24 is required for accessing and/or decrypting the encrypted content stored in the storage 26. For example, the access privilege for accessing the storage 26 can be derived from a consensus of the network 16 and a decryption key for the encrypted enrolled authentication data may be provided by the server 24.

In preferred embodiments, an access privilege of the network 16 needs to be combined with a decryption key generated by the server 24 from the decryption clue to access and decrypt the encrypted enrolled authentication data of the client 12, 12a, 12b.

The decryption clue may be stored in the client data block chain alongside information on the employed encryption modality, such that different encryption modalities can be employed for enrolled authentication data stored in the storage 26.

Referring back to FIG. 1, when the service 14a requires authentication by the user of the client 12a, the service 14, 14a, 14b can request a challenge for the hashed client identifier corresponding to the client 12a ("authenticate req."). A challenge request may be signed by the service 14a and may be recorded in the service data block chain. The client 12a may receive the challenge request ("verification req."), such as by accessing the service data block chain or by transmission of the challenge request to the client 12a by the server 24 or the network 16 of the system 10. Thus, a challenge request may be provided to the client 12, 12a, 12b without the service 14, 14a, 14b obtaining information about the client identifier.

The client 12a may respond to the challenge request ("verification resp.") by providing authentication information captured by a sensor 22a of the client 12a to the network 16 and/or the server 24. Following the transmission of the authentication information to the network 16, the authentication information provided by the client 12a may be authenticated by the system 10.

Figure 5:
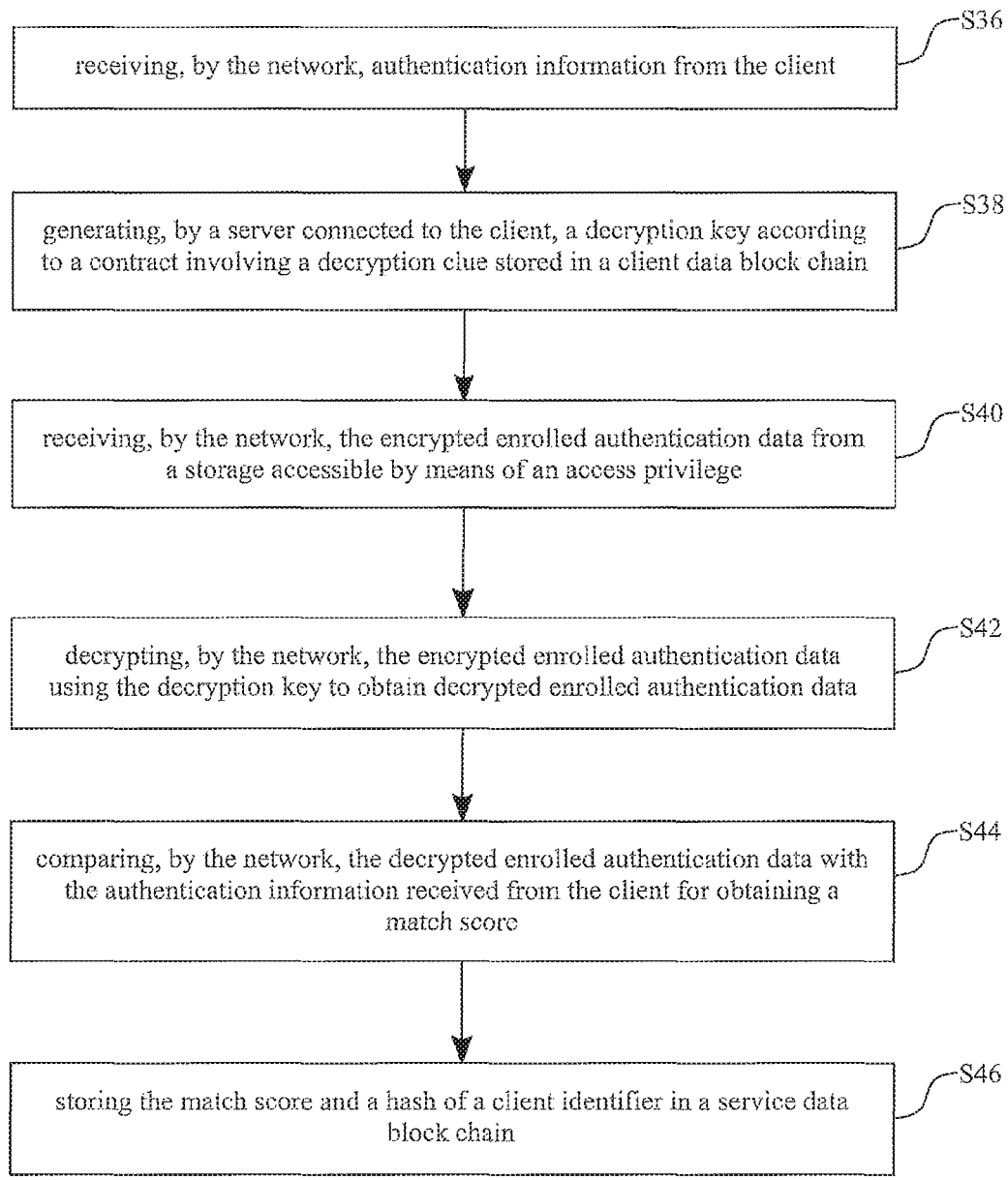
FIG. 5 is a flow diagram of a method to authenticate a client with a service according to an example.

A flow diagram of an authentication method according to an example is illustrated in FIG. 5. The illustrated method comprises receiving, by the network 16, authentication information from the client 12, 12a, 12b (step S36); generating, by a server 24 connected to the client 12, 12a, 12b, a decryption key according to a contract involving a decryption clue stored in a client data block chain (step S38). The method further comprises receiving, by the network 16, the encrypted enrolled authentication data from a storage 26 accessible by means of an access privilege (step S40); decrypting, by the network 16, the encrypted enrolled authentication data using the decryption key to obtain decrypted enrolled authentication data (step S42); comparing, by the network 16, the decrypted enrolled authentication data with the authentication information received from the client 12, 12a, 12b for obtaining a match score (step S44); and storing the match score and a hash of a client identifier in a service data block chain (step S46).

The matching of the decrypted enrolled authentication data and the authentication information may be performed according to the authentication modality specified by the service 14, 14a, 14b, such as involving a similarity threshold specified by the service 14, 14a, 14b.

The access privilege used to access the encrypted enrolled authentication data may be derived from a consensus of the peers 16a-16e of the network 16 and may further include a signature of the client 12, 12a, 12b, such as to restrict access to the enrolled authentication data to requests related to an authentic authentication method.

The configuration of the network 16 and the server 24 may hence provide a distribution of the access and decryption privileges between different parties, such that a transparent authentication method can be provided, wherein the confidentiality of the authentication data of the user can be protected by trusted authentication authorities selected by the client 12, 12a, 12b and/or the service 14, 14a, 14b. The authenticity of the matching can be validated by a consensus of the peers 16a-16e on the match score which may be recorded in the client data block chain.

Each of the server 24 and the network 16 may therefore contribute to the authentication method, wherein each of the server 24 and the network 16 can individually enforce the confidentiality of the method.

Figure 6:
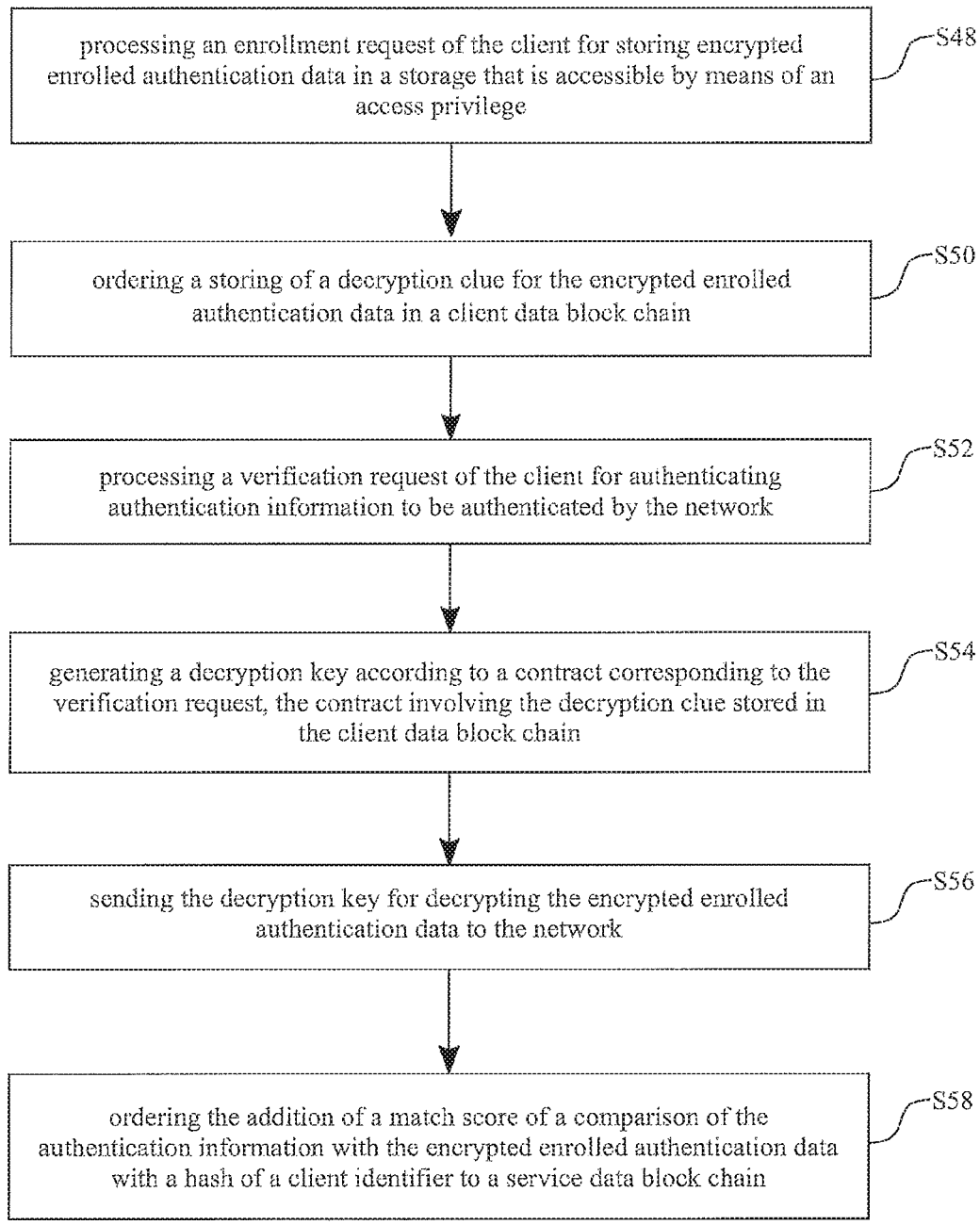
FIG. 6 is a flow diagram of a method to authenticate a client with a service for a server according to an example.

A flow diagram of an exemplary authentication method as performed by the server 24 is illustrated in FIG. 6. The illustrated method comprises processing an enrollment request of the client for storing encrypted enrolled authentication data in a storage that is accessible by means of an access privilege (step S48); ordering a storing of a decryption clue for the encrypted enrolled authentication data in a client data block chain (step S50); processing a verification request of the client for authenticating authentication information to be authenticated by the network (step S52); generating a decryption key according to a contract corresponding to the verification request, the contract involving the decryption clue stored in the client data block chain (step S54); sending the decryption key for decrypting the encrypted enrolled authentication data to the network (step S56); ordering the addition of a match score of a comparison of the authentication information with the encrypted enrolled authentication data with a hash of a client identifier to a service data block chain (step S58).

The server 24 can at least partially mediate the authentication method between the client 12, 12*a*, 12*b* and the service 14, 14*a*, 14*b* as an intermediary party to the client 12, 12*a*, 12*b* and the network 16.

While the server 24 has been described making reference to a single entity, a plurality of servers 24 may be used for separately and/or cooperatively performing any of the steps in the authentication method. For example, a separate encryption/decryption server 24 may be used for generating the decryption key according to the contract corresponding to the verification request. The encryption/decryption server 24 can generate the decryption key based on the machine dependent decryption key generation method, wherein the property of the hardware configuration of the encryption/decryption server 24 is involved in the generation of the decryption key, such that generation of the decryption key may only be performed by the encryption/decryption server 24.

The server 24 can cooperate with the network 16 to authenticate the client 12, 12*a*, 12*b*. The network 16 can comprise servers of trusted organizations, which may be trusted by the client 12, 12*a*, 12*b* and/or the service 14, 14*a*, 14*b*, and performs the matching between the enrolled authentication data and the authentication information provided by the client 12, 12*a*, 12*b*.

Figure 7:
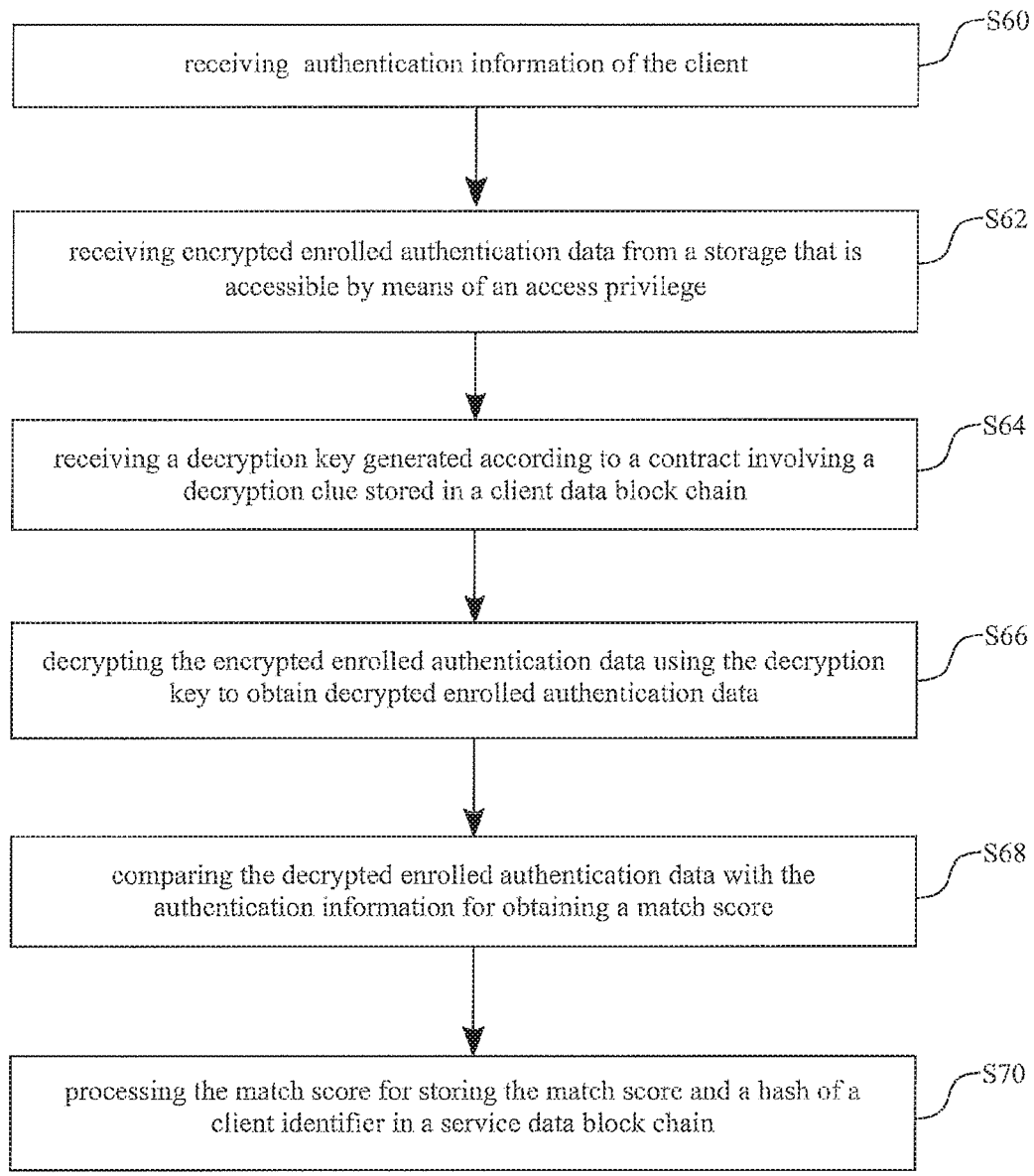
FIG. 7 is a flow diagram of a method to authenticate a client with a service for a network according to an example.

A flow diagram of an exemplary authentication method as performed by the network 16 is illustrated in FIG. 7. The illustrated method comprises receiving authentication information of the client (step S60); receiving encrypted enrolled authentication data from a storage that is accessible by means of an access privilege (step S62); receiving a decryption key generated according to a contract involving a decryption clue stored in a client data block chain (step S64); decrypting the encrypted enrolled authentication data using the decryption key to obtain decrypted enrolled authentication data (step S66); comparing the decrypted enrolled authentication data with the authentication information for obtaining a match score (step S68); and processing the match score for storing the match score and a hash of a client identifier in a service data block chain (step S70).

The peers 16*a*-16*e* of the network 16 may be selected by the client 12, 12*a*, 12*b* and/or the service 14, 14*a*, 14*b*, such as from a common subset of peers 16*a*-16*e* accepted by the client 12, 12*a*, 12*b* and the service 14, 14*a*, 14*b*, and may constitute a permissioned block chain network, such as peers 16*a*-16*e* of a hyperledger fabric framework or other permissioned blockchain topologies emerging on the market.

In some embodiments, some of the authentication steps are performed by a subset of the peers 16*a*-16*e* of the network 16. For example, decrypting the encrypted enrolled authentication data may be performed by a smaller number of peers 16*a*-16*e* than the other steps in the method, such that the decryption key need not be distributed to each of the peers 16*a*-16*e*. In this case, the decrypted authentication information can be distributed to other peers 16*a*-16*e* of the network 16 by the peers 16*a*-16*e* tasked with decrypting the encrypted enrolled authentication data.

During the authentication method, the generated decryption key may be transmitted over a potentially compromised communication network and hence, the encrypted enrolled authentication data stored in the storage can be compromised. The authentication method may therefore comprise a re-encryption method for the authentication data, which may be used to re-encrypt the decrypted enrolled authentication data, and/or to perform an update of the encryption modality used in the authentication method.

Figure 8:
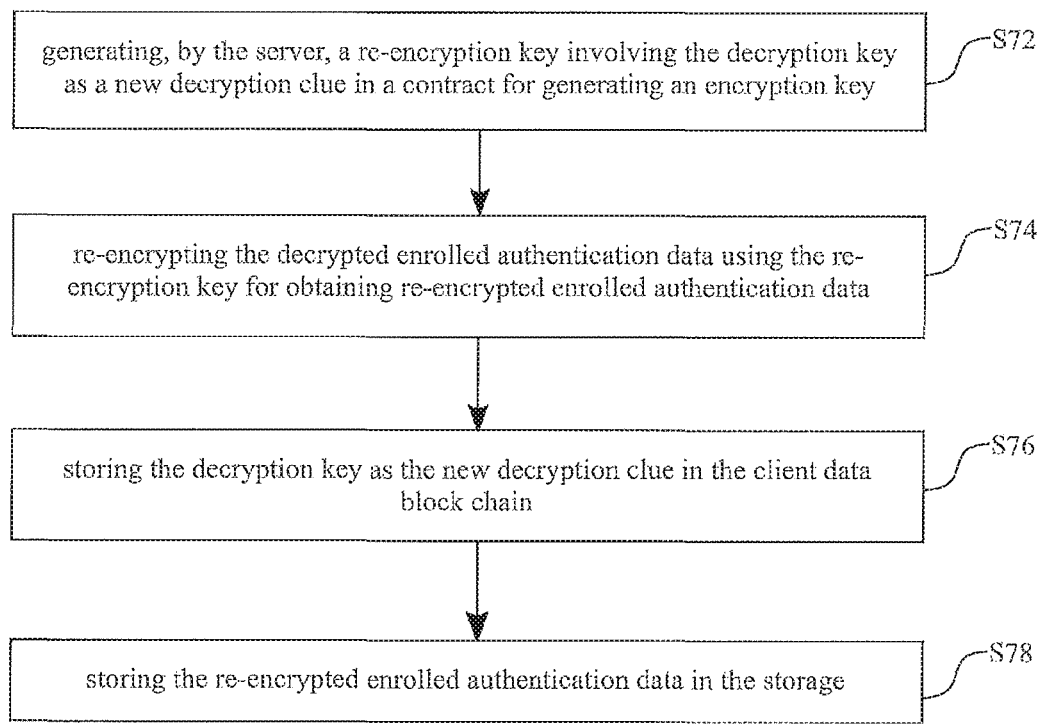
FIG. 8 is a flow diagram of a re-encryption process according to an example.

FIG. 8 illustrates a flow diagram of a re-encryption method, which can be used as part of the authentication method. The method comprises generating, by the server, a re-encryption key involving the decryption key as a new decryption clue in a contract for generating an encryption key (S72), and re-encrypting the decrypted enrolled authentication data using the re-encryption key for obtaining re-encrypted enrolled authentication data (S74). Then, the method comprises storing the re-encrypted enrolled authentication data in the storage (S78)

As an optional step, the method comprises storing the decryption key as the new decryption clue in the client data block chain (S76) as illustrated in FIG. 8. However, instead of storing the decryption key, a notice of a re-encryption may be stored in the client data block chain with the modality used for the re-encryption, and the server may recursively generate the decryption key from the decryption clue stored in the client data block chain according to the history of performed re-encryptions stored in the client data block chain.

Figure 9:
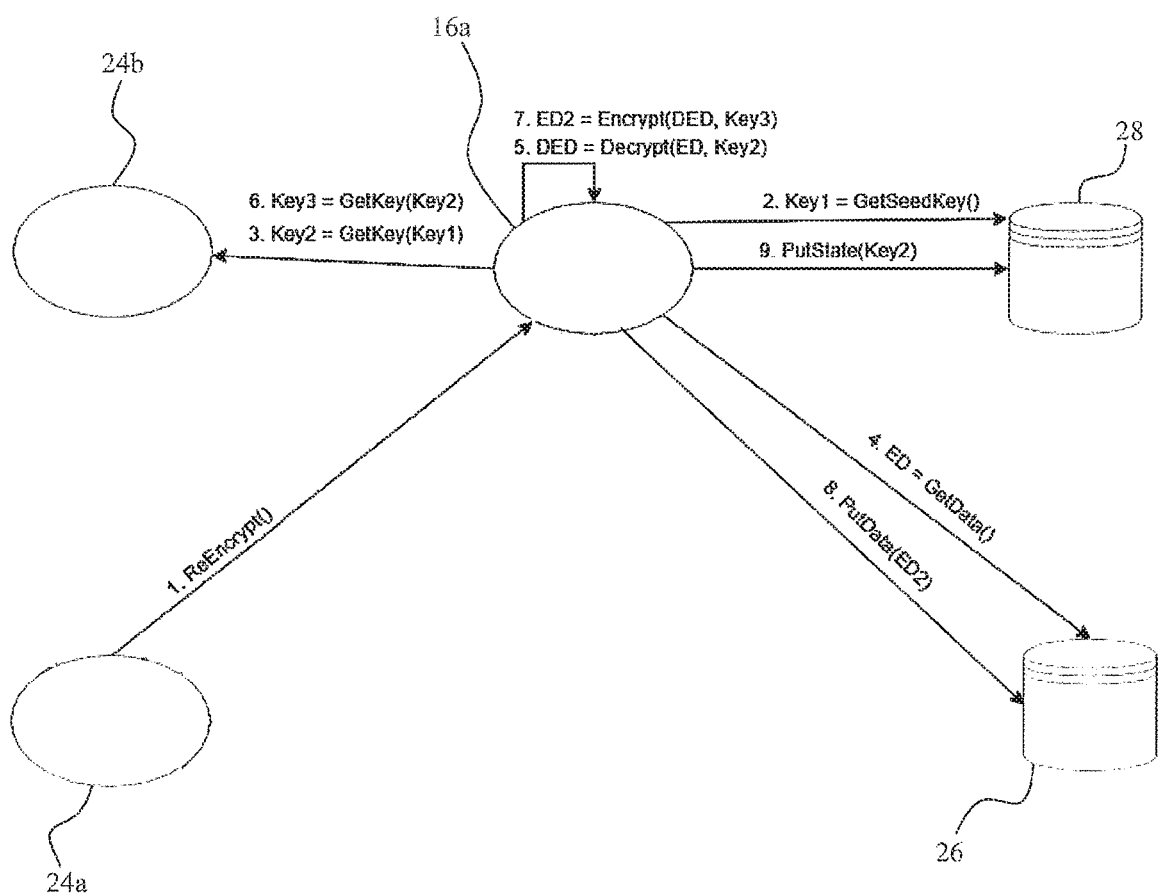
FIG. 9 is a schematic messaging diagram of a method to re-encrypt enrolled authentication data according to an example.

FIG. 9 illustrates a detail of a decryption and re-encryption process performed by servers 24*a*, 24*b* and a peer 16*a* of the network 16 as a messaging diagram between different entities of the system 10. A re-encryption request can be initiated by the server 24*a* and transmitted to the peer 16*a* of the network 16 (Step 1). The peer 16*a* requests a seed key Key1 from the client data block chain 28 (Step 2). The peer 16*a* can forward the seed key Key1 to the server 24*b* for generating a decryption key Key2 from the seed key Key1 (Step 3), and may request encrypted enrolled authentication data ED from the storage 26 (Step 4). The enrolled encrypted authentication data ED can be decrypted using the decryption key Key2 to obtain decrypted enrolled authentication data DED (Step 5).

Simultaneously, the peer 16*a* may initiate a re-encryption by requesting the generation of a re-encryption key Key3 from the decryption key Key2 from the server 24*b* (Step 6). The decrypted authentication data DED can be encrypted using the re-encryption key Key3 to obtain re-encrypted enrolled authentication data ED2 (Step 7). The re-encrypted enrolled authentication data ED2 can be transmitted to the storage 26 (Step 8) and the decryption key Key2 can be stored as a new decryption clue in the client data block chain 28 (Step 9).

Additionally, other peers 16*b*-16*e* of the network 16 may also perform decryption and/or re-encryption processes, such as to validate the correct conduct of the decryption/re-encryption by the peer 16*a*, and the re-encrypted enrolled authentication data ED2 may be validated based on a consensus between the peers 16a-16e of the network 16. The previously stored enrolled authentication data ED may be removed from the storage 26 following the consensus.

The description of the preferred embodiments and the figures merely serve to illustrate the invention and the beneficial effects associated therewith, but should not be understood to imply any limitation. The scope of the invention is to be determined solely by the appended claims.

LIST OF REFERENCE SIGNS 10 system
12, 12a, 12b client
14, 14a, 14b system
16 network of peers
16a-16e peers
18 server of peer
20a, 20b fingerprint sensors
22b camera
24, 24a, 24b server
26 storage
28 client data block chain

The invention claimed is:

1. An authentication method for authenticating a client with service over a network of peer devices, the method comprising:
   storing encrypted enrolled authentication data for the client in a storage that is accessible by means of an access privilege;
   storing a decryption clue for the encrypted enrolled authentication data in a client data block chain;
   receiving, by the network of peer devices, authentication information from the client;
   generating, by a server connected to the client, a decryption key according to a contract involving the decryption clue stored in the client data block chain;
   receiving, by the network of peer devices, the encrypted enrolled authentication data from the storage;
   decrypting, by the network of peer devices, the encrypted enrolled authentication data using the decryption key to obtain decrypted enrolled authentication data;
   comparing, by the network of peer devices, the decrypted enrolled authentication data with the authentication information received from the client for obtaining a match score based on a consensus of the peer devices of the network; and
   storing the match score and a hash of a client identifier in a service data block chain.

2. The authentication method of claim 1, wherein the contract is a machine dependent decryption key generation method generating the decryption key from the decryption clue depending on a hardware configuration of the server.

3. The authentication method of claim 1, further comprising:
   receiving, from the client, authentication data collected by the client to be used as the enrolled authentication data;
   generating the decryption clue for the enrolled authentication data;
   generating, by the server, an encryption key involving the decryption clue in a machine dependent encryption key generation method; and
   encrypting, using the encryption key, the enrolled authentication data for obtaining the encrypted enrolled authentication data.

4. The authentication method of claim 1, further comprising storing a hash of the enrolled authentication data with the decryption clue in the client data block chain.

5. The authentication method of claim 1, further comprising:
   generating, by the server, a re-encryption key involving the decryption key as a new decryption clue in a contract for generating an encryption key;
   re-encrypting the decrypted enrolled authentication data using the re-encryption key for obtaining re-encrypted enrolled authentication data;
   storing the decryption key as the new decryption clue in the client data block chain;
   storing the re-encrypted enrolled authentication data in the storage; and
   removing the encrypted enrolled authentication data from the storage.

6. The authentication method of claim 1, further comprising:
   receiving, from the service, an order for a registration token for a client registration;
   generating, by the network of peer devices the registration token and storing the registration token in the storage or the service data block chain;
   providing, to the service, the registration token;
   receiving, from the client, a signed registration token;
   updating the registration token in the storage or the service data block chain with the hash of the client identifier; and
   providing, to the service, the hash of the client identifier.

7. The authentication method of claim 1, further comprising:
   receiving, from the service, a challenge request for the client, wherein the challenge request is associated with the hash of the client identifier;
   storing the challenge request in the service data block chain;
   providing, to the client, the challenge request; and
   updating the challenge request with the match score in the service data block chain;
   wherein receiving the authentication information by the network of peer devices comprises receiving an identifier of the challenge request from the client.

8. An authentication method for authenticating a client with a service over a network of peer devices, the method comprising:
   processing an enrollment request of the client for storing encrypted enrolled authentication data in a storage that is accessible by means of an access privilege;
   ordering a storing of a decryption clue for the encrypted enrolled authentication data in a client data block chain;
   processing a verification request of the client for authenticating authentication information to be authenticated by the network of peer devices;
   generating a decryption key according to a contract corresponding to the verification request, the contract involving the decryption clue stored in the client data block chain;
   sending the decryption key for decrypting the encrypted enrolled authentication data to the network of peer devices; and
   ordering the addition of a match score of a comparison of the authentication information with the encrypted enrolled authentication data with a hash of a client identifier to a service data block chain based on a consensus of the peer devices of the network.

9. An authentication method for authenticating a client with a service over a network of peer devices, the method comprising:
   receiving authentication information of the client;
   receiving encrypted enrolled authentication data from a storage that is accessible by means of an access privilege;
   receiving a decryption key generated according to a contract involving a decryption clue stored in a client data block chain;
   decrypting the encrypted enrolled authentication data using the decryption key to obtain decrypted enrolled authentication data;
   comparing the decrypted enrolled authentication data with the authentication information for obtaining a match score based on a consensus of the peer devices of the network of peer devices; and
   processing the match score for storing the match score and a hash of a client identifier in a service data block chain.

10. A system for authenticating a client with a service over a network of peer devices, comprising:
   a server; and
   a storage that is accessible via an access privilege, wherein the storage stores encrypted enrolled authentication data for the client;
   wherein the server:
      orders the addition of a decryption clue to a client data block chain;
      generates a decryption key according to a contract involving the decryption clue stored in the client data block chain (28); and
   wherein the network of peer devices:
      receives the encrypted enrolled authentication data from the storage;
      decrypts the encrypted enrolled authentication data using the decryption key to obtain decrypted enrolled authentication data; and
      compares the decrypted enrolled authentication data with authentication information received from the client for obtaining a match score based on a consensus of the peer devices of the network to be stored with a hash of a client identifier in a service data block chain.

11. The system of claim 10, wherein:
   the server is further adapted to generate a re-encryption key involving the decryption key as an encryption clue involved in a contract for generating an encryption key; and
   wherein the system is further adapted to:
      re-encrypt the decrypted enrolled authentication data using the re-encryption key for obtaining re-encrypted enrolled authentication data;
      store the decryption key as the new decryption clue in the client data block chain;
      store the re-encrypted enrolled authentication data in the storage; and
      remove the encrypted enrolled authentication data from the storage.

12. A distributed network of peer devices for authenticating a client with a service, the peer devices each comprising a processor and a memory, wherein the network of peer devices is adapted for communicating with a server and is further adapted to:
   receive authentication information of the client;
   receive encrypted enrolled authentication data from a storage that is accessible by means of an access privilege;
   receive a decryption key for the encrypted enrolled authentication data generated by the server according to a contract involving a decryption clue stored in a client data block chain;
   decrypt the encrypted enrolled authentication data using the decryption key to obtain decrypted enrolled authentication data;
   compare the decrypted enrolled authentication data with the authentication information received from the client for obtaining a match score based on a consensus of the peer devices of the network; and
   transmit the match store for storing the match score with a hash of a client identifier in a service data block chain.

13. A hardware server device for authenticating a client with a service over a network of peer devices, wherein the hardware server device is adapted to:
   process an enrollment request of the client for storing encrypted enrolled authentication data in a storage that is accessible by means of an access privilege;
   generate a decryption key according to a contract involving a decryption clue for the encrypted enrolled authentication data;
   order the addition of the decryption clue to a client data block chain;
   process a verification request of the client for authenticating authentication information to be authenticated by the network of peer devices; and
   order the addition of a match score of a comparison of the authentication information with the encrypted enrolled authentication data with a hash of a client identifier to a service data block chain based on a consensus of the peer devices of the network.

14. The hardware server device of claim 13, wherein the contract is a machine dependent decryption key generation method generating the decryption key from the decryption clue depending on a hardware configuration of the hardware server device.

* * * * *